United States Patent [19]

Kobuki et al.

[11] Patent Number: 4,494,723
[45] Date of Patent: Jan. 22, 1985

[54] DEVICE FOR MOUNTING AN ENGINE ON A VEHICLE BODY

[75] Inventors: Shinzo Kobuki; Hazime Kubota; Tsuneo Miyamaru, all of Toyota, Japan

[73] Assignee: Toyota Jidosha Kabushiki Kaisha, Toyota, Japan

[21] Appl. No.: 454,009

[22] Filed: Dec. 28, 1982

[51] Int. Cl.³ ............................................. F16M 13/00
[52] U.S. Cl. .................................. 248/635; 248/659; 180/312
[58] Field of Search ........................ 248/659, 605, 635; 267/140.1; 180/291, 312, 300

[56] References Cited
U.S. PATENT DOCUMENTS

| | | | |
|---|---|---|---|
| 3,730,462 | 5/1973 | Dick | 248/659 |
| 3,851,722 | 12/1974 | Grosseau | 248/635 X |
| 4,377,218 | 3/1983 | Fukushima | 180/312 |
| 4,403,762 | 9/1983 | Cogswell | 248/659 X |
| 4,405,027 | 9/1983 | Enokimoto | 180/312 X |
| 4,445,662 | 5/1984 | Fukushima | 248/659 X |
| 4,449,603 | 5/1984 | Langwieder | 180/312 X |

FOREIGN PATENT DOCUMENTS 56-062219  5/1981  Japan .
191128  11/1982  Japan ............................. 180/312

Primary Examiner—J. Franklin Foss
Attorney, Agent, or Firm—Kenyon & Kenyon

[57] ABSTRACT

A device, for mounting an engine on a vehicle body, comprising a mount insulator which has a shaft fixed onto the vehicle body. A hollow cylindrical rubber ring, surrounded by a cylindrical metallic outer member, is inserted onto the shaft. A dish-shaped insulator bracket is fixed onto the cylindrical outer member of the mount insulator. A dish-shaped engine mount bracket is fixed onto the engine body. The insulator bracket has inclined wall portions at the opposed ends thereof. Each of the inclined wall portions has a threaded hole formed thereon. The engine mount bracket has inclined wall portions at the opposed ends thereof. Each of the inclined wall portions has a slot formed thereon. When the engine mount bracket and the insulator bracket are superimposed in order to assemble the engine to the engine body, the engine mount bracket is just fitted onto the insulator bracket, and the threaded bores of the insulator bracket are aligned with the corresponding slots of the engine mount bracket.

7 Claims, 2 Drawing Figures

DEVICE FOR MOUNTING AN ENGINE ON A VEHICLE BODY

BACKGROUND OF THE INVENTION

The present invention relates to a device for mounting an engine on a vehicle body.

In the manufacturing process of a motor vehicle, it is important to rapidly and precisely assemble an engine to a predetermined regular position of the vehicle body in view of the reduction of the manufacturing cost and the maintenance of high quality. Particularly, in a front engine-front drive-type motor vehicle in which the transmission, the differential gear apparatus, the clutch apparatus, and the drive shaft are arranged in the engine compartment, the above-mentioned rapid and precise assembling is important.

SUMMARY OF THE INVENTION

An object of the present invention is to provide an engine mounting device capable of rapidly and precisely mounting an engine to a predetermined regular position of a vehicle body.

According to the present invention, there is provided a device for mounting an engine on a vehicle body, comprising: a mount insulator having a shaft fixed onto the vehicle body, a substantially cylindrical outer member, and a substantially cylindrical hollow rubber ring inserted between said shaft and said cylindrical outer member; a dish-shaped insulator bracket fixed onto said cylindrical outer member and substantially horizontally extending in a direction which is perpendicular to a longitudinal axis of the engine body, said insulator bracket having a substantially horizontally extending bottom wall portion and inclined wall portions which are formed at opposite ends of said bottom wall portion and have a threaded hole formed thereon; a dish-shaped engine mount bracket fixed onto the engine body and substantially horizontally extending in a direction which is perpendicular to the longitudinal axis of the engine body, said engine mount bracket having a substantially horizontally extending bottom wall portion and inclined wall portions which are formed at opposite ends of the bottom wall portion of said engine mount bracket, the bottom wall portion and the inclined wall portions of said engine mount bracket having such a shape that they are appropriately fitted onto the bottom wall portion and the inclined wall portions of said insulator bracket, respectively, when said engine mount bracket and said insulator bracket are superimposed onto each other, each of the inclined wall portions of said engine mount bracket having a slot which extends in the longitudinal direction of said engine body and is aligned with said corresponding threaded hole when said engine mount bracket and said insulator bracket are superimposed onto each other; and bolts inserted into said corresponding slots and screwed into said corresponding threaded holes for fixing said engine mount bracket onto said insulator bracket.

The present invention may be more fully understood from the description of a preferred embodiment of the invention set forth below, together with the accompanying drawings.

DESCRIPTION OF A PREFERRED EMBODIMENT

Figure 1:
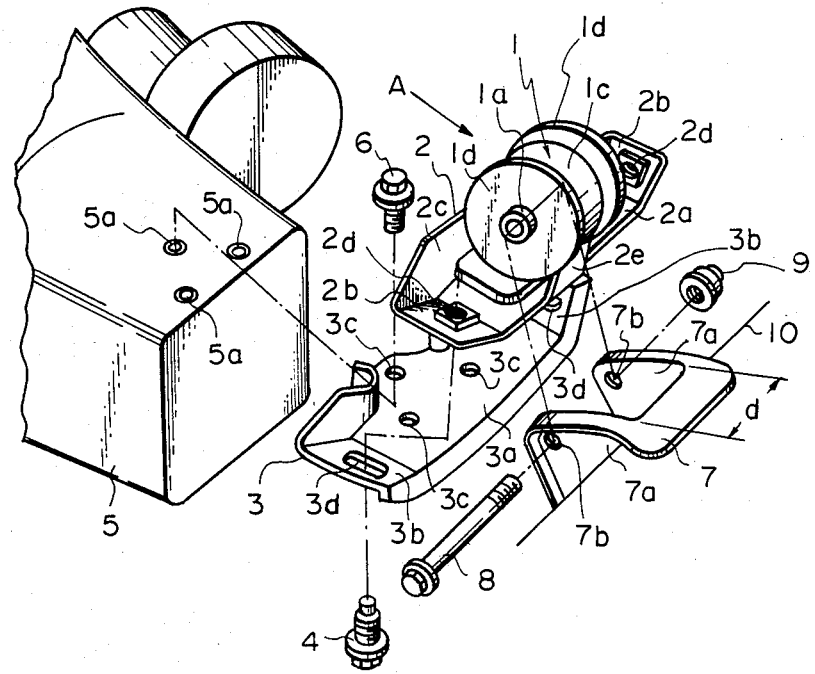
FIG. 1 is an exploded view of a device for mounting an engine on a vehicle body.

Referring to FIG. 1, reference numeral 1 designates a mount insulator, 2 an insulator bracket, 3 an engine mount bracket, and 5 an transaxle of the engine; 7 designates a body mount bracket, and 10 a vehicle body. The body mount bracket 7 is, for example, welded to the vehicle body 10 and has a pair of spaced flanges 7a opposing each other and distanced by d. The flanges 7a project from the vehicle body 10 towards the transaxle 5 of the engine. Threaded holes 7b are formed on the flanges 7a, respectively, in the same horizontal plane.

Figure 2:
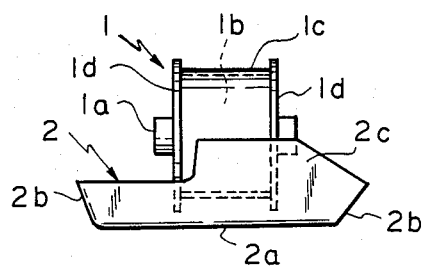
FIG. 2 is a side view of the mount insulator taken in the direction of the arrow A in FIG. 1.

As illustrated in FIGS. 1 and 2, the mount insulator 1 comprises a hollow cylindrical shaft 1a made of a metallic material, and a pair of disc-shaped flange 1d fixed onto the shaft 12. A hollow cylindrical rubber ring 1b is inserted and fixed onto the shaft 1a located between the flanger 1d. The end faces of the rubber ring 16 are not fixed onto the flanges 1a, but continuously contact them. The outer circumferential wall of the rubber ring 1b is surrounded by a thin walled hollow cylindrical outer member 1c made of an iron steel, and the inner circumferential wall of the hollow cylindrical outer member 1c is rigidly fixed onto the outer circumferential wall of the rubber ring 1b.

The insulator bracket 2 comprises a substantially horizontally extending bottom wall portion 2a, and a pair of inclined wall portions 2b which are bent upwardly at opposite ends of the bottom wall portion 2a, respectively. Consequently, the insulator bracket 2 has a dish shape. In addition, the insulator bracket 2 comprises a up-right end wall portion 2c which is formed in one piece on the bottom wall portion 2a and the inclined wall portions 2b. Threaded holes 2d are formed on the inclined wall portions 2b. An upwardly bent arm 2e is formed in one place on the bottom wall portion 2a, and the upper end of the arm 2e is welded to the hollow cylindrical water member 1c of the mount insulator 1. Consequently, the insulator bracket 2 is rigidly connected to the hollow cylindrical outer member 1c but is resiliently connected to the shaft 1a via the rubber ring 1b. The shaft 1a has a length which is slightly shorter than the distance d between the flanges 7a of the body mount bracket 7. Before the engine is assemblied to the vehicle body 10, the mount insulator 1 is assemblied to the body mount bracket 7. That is, the shaft 1a is inserted between the flanges 7a, and a bolt 8 is inserted into bores 7b of the flanges 7a and the central bore of the shaft 1a. After this, a nut 9 is screwed onto the belt 8 and, thus, the mount insulator 1 is assembled to the vehicle body 10 via the body mount bracket 7.

The engine mount bracket 3 comprises a substantially horizontally extending bottom wall portion 3a, and a pair of inclined wall portions 3b which are bent upwardly at the opposed ends of the bottom wall portion 3a, respectively. Consequently, the engine mount bracket 3 has a dish shape. In addition, this dish shape is formed so that the dish-shaped insulator bracket 2 is just fitted onto the dish-shaped engine mount bracket 3. Three bores 3c are formed on the bottom wall portion 3a, and slots 3d, extending in a direction which is perpendicular to the longitudinal direction of the engine mount bracket 3, are formed on the inclined wall portions 3b, respectively, so that the threaded bores 2d of the insulator bracket 2 can be aligned with the corresponding slots 3d when the insulator bracket 2 is laid on the engine mount bracket 3.

The transaxle 5 forms a portion of the engine body, and the main part of the engine body (not shown) is located on the left side of the transaxle 5 in FIG. 1. This transaxle 5 includes therein the transmission, the differential gear apparatus and the clutch apparatus. As illustrated in FIG. 1, three threaded holes 5a, corresponding to the bores 3c of the engine mount bracket 3, are formed on the transaxle 5, and the engine mount bracket 3 is fixed onto the transaxle 5 by means of belts 6 before the engine is assembled to the vehicle body 10.

When the engine is assembled to the vehicle body 10, first, the engine mount bracket 3, fixed onto the transaxle 5 and located beneath the insulator bracket 2 of the mount insulator 1, is lifted upward and then superimposed onto the lower face of the insulator bracket 2. At this time, the threaded holes 2d of the insulator bracket 2 are automatically aligned with the corresponding slots 3d of the engine mount bracket 3. After this, bolts 4 are inserted into the slots 3d and screwed into the threaded holes 2c and, as a result, the engine mount insulator 3 is rigidly fixed onto the insulator bracket 2. Thus, the transaxle 5 is resiliently supported by the vehicle body 10 via the mount insulator 1 and, the engine vibration is absorbed by the damping action of the mount insulator 1. As is understood from FIG. 1, the slots 3d of the engine mount bracket 3 extend is the longitudinal direction of the engine body. Consequently, even if the position of the transaxle 5 is slightly offset from a predetermined regular position, the engine mount bracket 3 can be easily fixed onto the insulator bracket 2.

According to the present invention, since the insulator bracket 2 and the engine mount bracket 3 have a dish shape, the threaded holes 2d of the insulator bracket 2 can be easily aligned with the slots 3d of the engine mount bracket 3. Consequently, it is possible to rapidly assemble the engine to a predetermined regular position of the vehicle body 10.

While the invention has been described by reference to a specific embodiment chosen for purposes of illustration, it should be apparent that numerous modifications could be made thereto by those skilled in the art without departing from the basic concept and scope of the invention.

We claim:

1. A device for mounting an engine on a vehicle body, comprising:
   a mount insultor having a shaft fixed onto the vehicle body, a substantially cylindrical outer member, and a substantially cylindrical hollow rubber ring inserted between said shaft and said cylindrical outer member;
   a dish-shaped insulator bracket fixed onto said cylindrical outer member and substantially horizontally extending in a direction which is perpendicular to a longitudinal axis of the engine body, said insulator bracket having a substantially horizontally extending bottom wall portion and inclined wall portions which are formed at opposite ends of said bottom wall portion and have a threaded hole formed thereon;
   a dish-shaped engine mount bracket fixed onto the engine body and substantially horizontally extending in a direction which is perpendicular to the longitudinal axis of the engine body, said engine mount bracket having a substantially horizontally extending bottom wall portion and inclined wall portions which are formed at opposite ends of the bottom wall portion of said engine mount bracket, the bottom wall portion and the inclined wall portions of said engine mount bracket having such a shape that they are appropriately fitted onto the bottom wall portion and the inclined wall portions of said insulator bracket, respectively, when said engine mount bracket and said insulator bracket are superimposed onto each other, each of the inclined wall portions of said engine mount bracket having a slot which extends in the longitudinal direction of said engine body and is aligned with said corresponding threaded hole when said engine mount bracket and said insulator bracket are superimposed onto each other; and
   bolts inserted into said corresponding slots and screwed into said corresponding threaded holes for fixing said engine mount bracket onto said insulator bracket.

2. A device according to claim 1, wherein said device comprises a body mount bracket fixed onto the engine having a pair of spaced flanges which project towards the engine body, said shaft being supported by and between said flanges.

3. A device according to claim 2, wherein said shaft has an axially extending central bore and is supported by said flanges by means of a bolt which extends through said flanges and said central bore.

4. A device according to claim 1, wherein said shaft has a pair of spaced disc-shaped flanges fixed thereonto, said cylindrical outer member and cylindrical hollow rubber ring being inserted between said disc-shaped flanges.

5. A device according to claim 4, wherein said rubber ring has a substantially cylindrical outer wall and an inner wall fixed onto said shaft, said cylindrical outer member being fixed onto the cylindrical outer wall of said rubber ring, but said rubber member and said cylindrical outer member are not fixed onto said disc-shaped flanges.

6. A device according to claim 1, wherein the bottom wall portion of said engine mount bracket has an upwardly extending arm formed thereon, said arm having a tip portion which is fixed onto said cylindrical outer membrane.

7. A device according to claim 1, wherein the bottom wall portion of said engine mount bracket is fixed onto a transaxle of the engine body by means of bolts.

* * * * *